(12) United States Patent
Merkel et al.

(10) Patent No.: US 9,099,953 B2
(45) Date of Patent: Aug. 4, 2015

(54) CONTROL METHOD AND DEVICE FOR AN ELECTRIC MACHINE

(75) Inventors: Tino Merkel, Schwieberdingen (DE); Markus Kretschmer, Pleidelsheim (DE); Gunther Goetting, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 104 days.

(21) Appl. No.: 13/989,011

(22) PCT Filed: Sep. 21, 2011

(86) PCT No.: PCT/EP2011/066413
§ 371 (c)(1),
(2), (4) Date: Aug. 7, 2013

(87) PCT Pub. No.: WO2012/069229
PCT Pub. Date: May 31, 2012

(65) Prior Publication Data
US 2013/0320891 A1  Dec. 5, 2013

(30) Foreign Application Priority Data

Nov. 24, 2010 (DE) .......................... 10 2010 061 897

(51) Int. Cl.
| | | |
|---|---|---|
| *H02P 21/00* | (2006.01) | |
| *H02P 6/20* | (2006.01) | |
| *H02P 29/00* | (2006.01) | |
| *H02P 6/14* | (2006.01) | |

(52) U.S. Cl.
CPC .............. *H02P 21/0032* (2013.01); *H02P 6/14* (2013.01); *H02P 6/20* (2013.01); *H02P 21/0021* (2013.01); *H02P 29/0088* (2013.01)

(58) Field of Classification Search
CPC .............................. H02P 21/0021; H02P 1/46

USPC ....................................................... 318/400.02
See application file for complete search history.

(56) References Cited

U.S. PATENT DOCUMENTS

| 5,731,669 A * | 3/1998 | Shimizu et al. ............... 318/139 |
| 2005/0248306 A1 * | 11/2005 | Chen et al. ..................... 318/712 |
| 2011/0056226 A1 * | 3/2011 | Okubo et al. ................... 62/208 |

FOREIGN PATENT DOCUMENTS

| CN | 101689822 | 3/2010 |
| DE | 102007031548 | 9/2010 |
| JP | H1034190 | 2/1998 |
| JP | 64-34190 | 2/2004 |

OTHER PUBLICATIONS

Consoli, et al., "Sensorless Control of PM Synchronous Motors at Zero Speed", Conference Record of the 1999 IEEE Industry Applications Conference, Thirty-Forth IAS Annual Meeting (CAT. No. 99CH36370, IEEE, IEEE Piscataway, NJ, USA, Bd. 2, Oct. 2, 1999, Seiten 1033-1040, XP010355328.

* cited by examiner

*Primary Examiner* — Erick Glass
(74) *Attorney, Agent, or Firm* — Kenyon & Kenyon LLP

(57) ABSTRACT

A method is described for controlling an electric machine during a motor startup operation with the aid of a power electronics device, in particular for use in a motor vehicle. The power electronics device includes a plurality of controllable power switches which are connected for the purpose of supplying an electrical current to the electric machine in polyphase form. The power electronics device is controlled in such a way that the electric machine outputs a startup torque, and the control of the power electronics device for outputting the startup torque takes place in such a way that the switching position of at least two of the power switches is changed, with the result that the power switches are subjected to a more uniform load.

8 Claims, 4 Drawing Sheets

CONTROL METHOD AND DEVICE FOR AN ELECTRIC MACHINE

FIELD OF THE INVENTION

The present invention relates to a method for controlling an electric machine during a motor startup operation with the aid of a power electronics device in particular for use in a motor vehicle, the power electronics device having a plurality of controllable power switches, which are connected for the purpose of supplying the electric machine with electrical current in a polyphase form, and the power electronics device being controlled in such a way that the electric machine outputs a startup torque.

Furthermore, the present invention relates to a device for controlling an electric machine during a motor startup operation, in particular for use in a motor vehicle, having a power electronics device which has a plurality of controllable power switches, which are connected for the purpose of supplying the electric machine with electrical current in a polyphase form, and a control unit for controlling the power electronics device.

Furthermore, the present invention relates to a motor vehicle drive train having at least one electric machine for providing driving power and a device for controlling the electric machine of the type described above.

BACKGROUND INFORMATION

In the field of motor vehicle drive technology, it is generally known that an electric machine may be used as the drive alone or jointly with a drive motor of a different type (hybrid drive). Electric machines are typically used as the drive motor in such electric or hybrid vehicles. For controlling such electric machines in a motor vehicle, a power electronics device is used, including an inverter which converts the direct voltage/direct current of an onboard (high voltage) battery of the motor vehicle into an alternating current. The inverter generally has a plurality of controllable power switches. The power switches are controlled pulse-width-modulated by a control unit in such a way that the electric machine generates a certain torque at a certain rotational speed of an output shaft of the electric machine during a motor operation.

It is known that a field-oriented regulation (also known as vector regulation) may be used for controlling such inverters for electric machines. In this case, a space vector (for example, a current vector) is moved, rotating with the output shaft of the electric machine. In other words, the phase currents required for controlling the electric machine are converted into a coordinate system (so-called dq system) which rotates with the magnetic field of the machine and is fixedly mounted on the rotor. In fiend-oriented regulation, current components Id and Iq, which are transformed in this way, are then regulated instead of the phase currents.

If a purely electrically driven vehicle or a hybrid vehicle is to be driven by the electric machine, it may happen that a very high startup torque is necessary to move the vehicle from a standstill. This may occur, for example, when starting on a hill, during trailer operation or when driving over a curb or when the weight of the vehicle is relatively high with respect to the maximum power of the electric machine.

When the vehicle is at a standstill, the electric machine is also at a standstill. At a standstill and when starting up from a standstill the power switches are loaded unevenly since in this state the same power switch(es) will always carry the current required for the startup or standstill torque. Motor startup operation is understood below to refer to operation of the electric machine at a standstill or at a very low rotational speed at which this uneven load on the power switches may occur. If multiple power switches are carrying current in this state, then one of them will generally be under a particularly heavy load, namely the one having the maximum current flow.

SUMMARY

The present invention provides a method for controlling an electric machine, in particular an electric three-phase machine during a motor startup operation with the aid of a power electronics device, in particular for use in a motor vehicle, the power electronics device having a plurality of controllable power switches, which are connected to the electric machine for the purpose of supplying the electric machine with electrical current in polyphase form, the power electronics device being controlled in such a way that the idle or starting electric machine outputs a standstill or startup torque, the control of the power electronics device for outputting the standstill or startup torque taking place in such a way that the switch position of at least two of the power switches is changed, so that the power switches are under more uniform loads.

Furthermore, the object defined above is achieved by a device for controlling an electric machine of the type defined at the outset, using a control unit for controlling the power electronics device, the control unit being equipped to carry out the method of the type defined above.

Finally, the present invention makes available a motor vehicle drive train having at least one electric machine for providing driving power and a device for controlling the electric machine of the aforementioned type.

Motor startup operation is understood in the present case to refer to an operating state in which the rotational speed of the electric machine is low or zero (for example, less than 10 revolutions per second) and there is a demand for torque.

The thermal peak load of the individual power switches may be reduced through the present invention.

In other words, the power electronics device for outputting the standstill torque is controlled in such a way that an operating point of the power electronics device is changed incrementally, in particular to achieve a more uniform load on the power switches in this way. The incremental change in the operating point may be accomplished in such a way that the startup torque remains essentially constant. Alternatively or additionally, it is possible to change the operating point in such a way that the startup torque is changed incrementally and in rapid sequence in such a way that the torque output on the average corresponds to the required startup torque. A change in torque should preferably take place so quickly that there is no jerking of the vehicle or the like which is perceivable for a driver.

The electric machine generally has a number of field windings. A bridge branch having at least two power switches is preferably provided for each field winding or for each phase of the electric machine. A three-phase electric machine such as a permanently excited synchronous machine, for example, therefore preferably has a so-called B6 bridge having three bridge branches.

The power switches may preferably be power semiconductor components, in particular IBGTs.

It is preferred in particular if the control is field-oriented, a space vector being changed incrementally to output the standstill torque.

The change in the operating point may take place easily in this way through the control technology.

It is advantageous here if the space vector is a current vector, which is rotated to output the startup torque incrementally along a line of a constant torque.

The required startup torque may be provided at a constant level through this measure. In this way, the method according to the present invention may be carried out without a driver of the vehicle noticing it.

According to another preferred specific embodiment, the space vector is a current vector which is changed incrementally in such a way that the startup torque changes.

As already explained above, this should take place rapidly and within certain limits, so that a driver of the vehicle does not notice the change in torque much or at all. The startup operating points may therefore be selected in such a way that the required startup torque is provided in the average over time.

In this specific embodiment, it is an advantage in particular if the current vector is moved along a line of a minimal total current.

Efficiency may be increased in this way.

Furthermore, it is preferable on the whole if the space vector is moved in an oscillating or cyclic or incremental manner in the range between at least two limiting values.

A plurality of different operating points may be approached in this way, so that the load on the individual power switches may be made even more uniform.

Furthermore, it is advantageous on the whole if the method according to the present invention is used when the rotational speed of the electric machine does not exceed a certain limiting value, which may be, for example, 10 revolutions per second, preferably 1 revolution per second.

Furthermore, it is preferable in particular if the method according to the present invention is used when a startup torque above a certain threshold value is required. The threshold value may be 50% of the maximum torque, for example, preferably 80% of the maximum torque.

DETAILED DESCRIPTION

Figure 1:
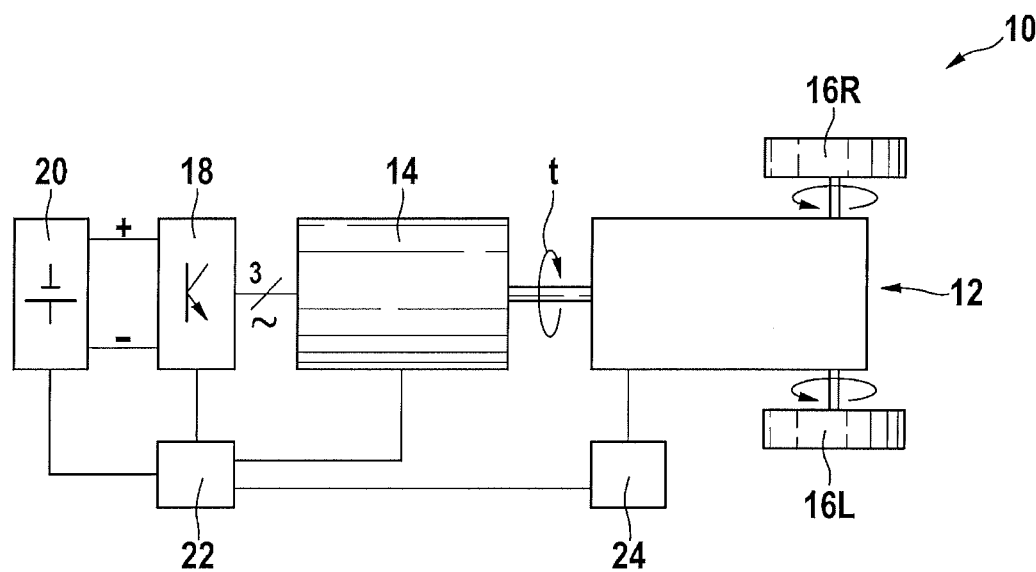
FIG. 1 shows in schematic form a motor vehicle having a drive train, which has an electric machine and a device for controlling this machine

FIG. 1 schematically shows a motor vehicle generally labeled with reference numeral 10. Motor vehicle 10 has a drive train 12, which includes an electric machine 14 for providing driving power in the present case. Drive train 12 is used to drive driven wheels 16L, 16R of a vehicle 10.

Electric machine 14 provides a torque t on an output shaft and rotates at an adjustable rotational speed.

Drive train 12 may be equipped to drive vehicle 10 alone with the aid of electric machine 14 (electric vehicle). Alternatively, electric machine 14 may be part of a hybrid drive train 12, drive train 12 optionally including another drive motor, such as an internal combustion engine or the like, which is not identified further in FIG. 1. Furthermore, drive train 12 may have a transmission or the like in this case.

Electric machine 14 is designed as a polyphase machine (having three phases in the present case) and is controlled with the aid of power electronics device 18. Power electronics device 18 is connected to a power supply such as a d.c. power supply (e.g., a battery) 20 of vehicle 10 and is used to rectify a d.c. voltage supplied by battery 20 into alternating currents for the three phases of the electric machine. Power electronics device 18 has a plurality of power switches for this purpose and is controlled by a control unit 22. Control unit 22 may also be connected to electric machine 14 to receive actual values of the rotational speed and/or rotational position of a rotor of electric machine 14. Furthermore, control unit 22 may be connected to battery 20. Finally, control unit 22 may be connected to a higher-level or equal control device 24 for controlling additional components of drive train 12.

Figure 2:
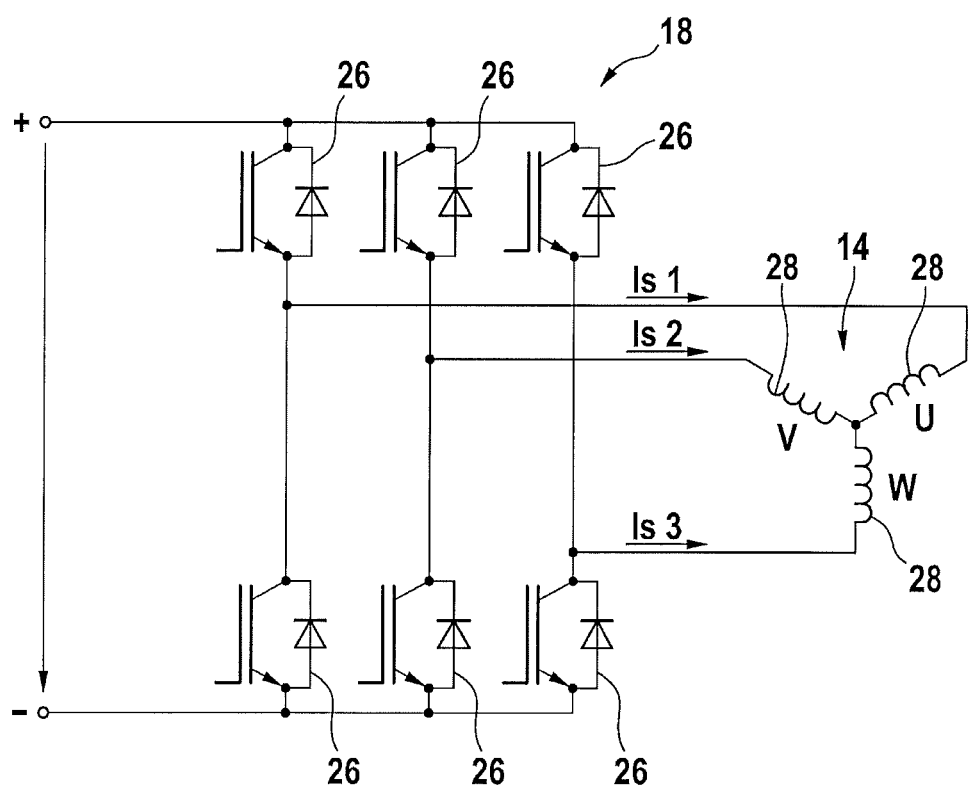
FIG. 2 shows a diagram of an exemplary electric machine and a corresponding power electronics device.

FIG. 2 shows power electronics device 18 and electric machine 14 in schematic form.

Power electronics device 18 has a total of six power switches in the form of power semiconductors (such as IGBTs, for example) which are interconnected in an essentially known H-bridge circuit for supplying three-phase currents Is1, Is2 and Is3. The center taps of the three bridge branches are each connected to corresponding field windings 28 of electric machine 14. Field windings 28 are interconnected in a star pattern, so that preferably no neutral conductor is provided.

Field windings 28 are labeled as phase V, phase U and phase W in FIG. 2. Power switches 26 are controlled pulse-width-modulated in such a way that essentially sinusoidal phase currents Is1, Is2, Is3 may be supplied and may also be phase-shifted in relation to one another.

To facilitate the control of the power semiconductors, they are controlled in a field-oriented manner or in the manner of a vector control. Phase currents Is1, Is2 and Is3 here are converted into a co-rotating coordinate system (so-called dq system) which is affixed to the rotor in an idle mount and rotates with the magnetic field of electric machine 14. Instead of the phase currents, current components Id and Iq transformed in this way are controlled.

Figure 3:
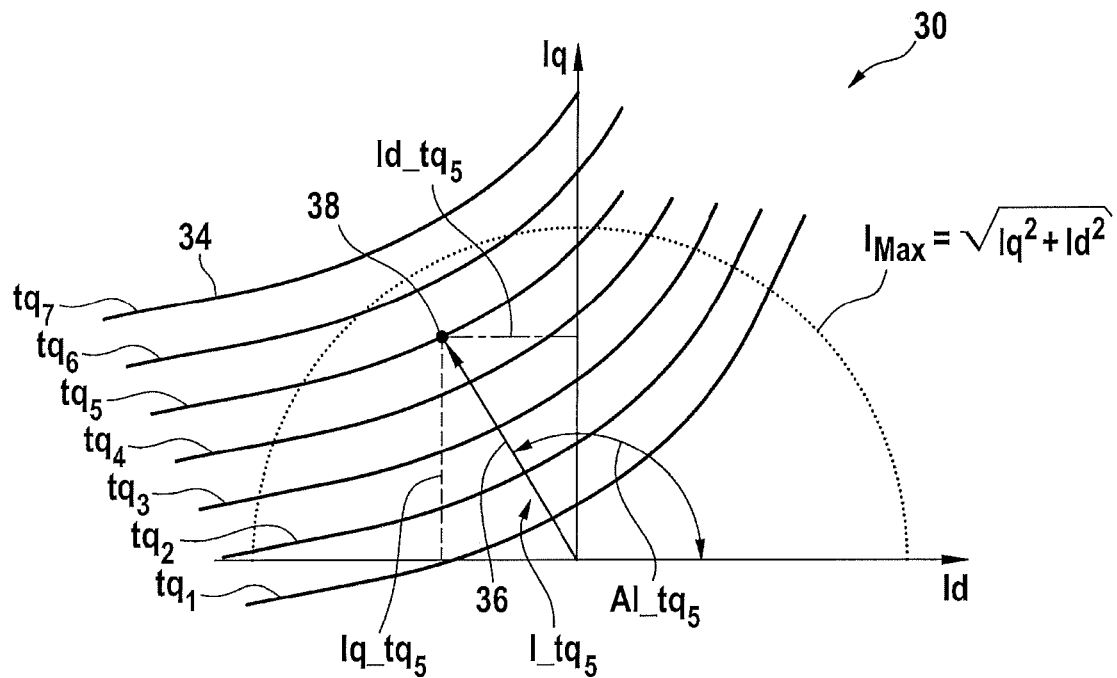
FIG. 3 shows a diagram of current components Id and Iq for carrying out a field-oriented control of the electric machine.

FIG. 3 shows a diagram of these transformed current components Id, Iq. For electric machine 14 to provide a certain torque t, these currents id, iq are each set to a certain value. The total current is obtained by equation $I=\sqrt{(Iq^2+Id^2)}$. Maximum total current $I_{max}$ of electric machine 14 is represented as a semicircle 32 in diagram 30.

FIG. 3 also shows a plurality of lines of constant torque labeled as $tq_1$, $tq_2$, $tq_3$, $tq_4$, $tq_5$, $tq_6$ and $tq_7$.

These torque lines have a curved shape, so that a working point 38 at which the total current is minimal may be established for providing a certain torque (for example, $tq_5$). Total current $I\_tq_5$ is obtained in this case as a current vector 36 composed of transformed current components $Id\_tq_5$ and $Iq\_tq_5$. Current vector 36 has a certain value and a certain current vector angle, shown at $AI\_tq_5$ in FIG. 3.

If a comparatively high torque is required (for example, $tq_5$) and the rotational speed of electric machine 14 is zero or very low, there may be an intolerable heating of individual power switches due to uneven loads on power switches 26. In the related art, the current and thus the torque are therefore reduced to a lower level as a safety measure.

Figure 4:
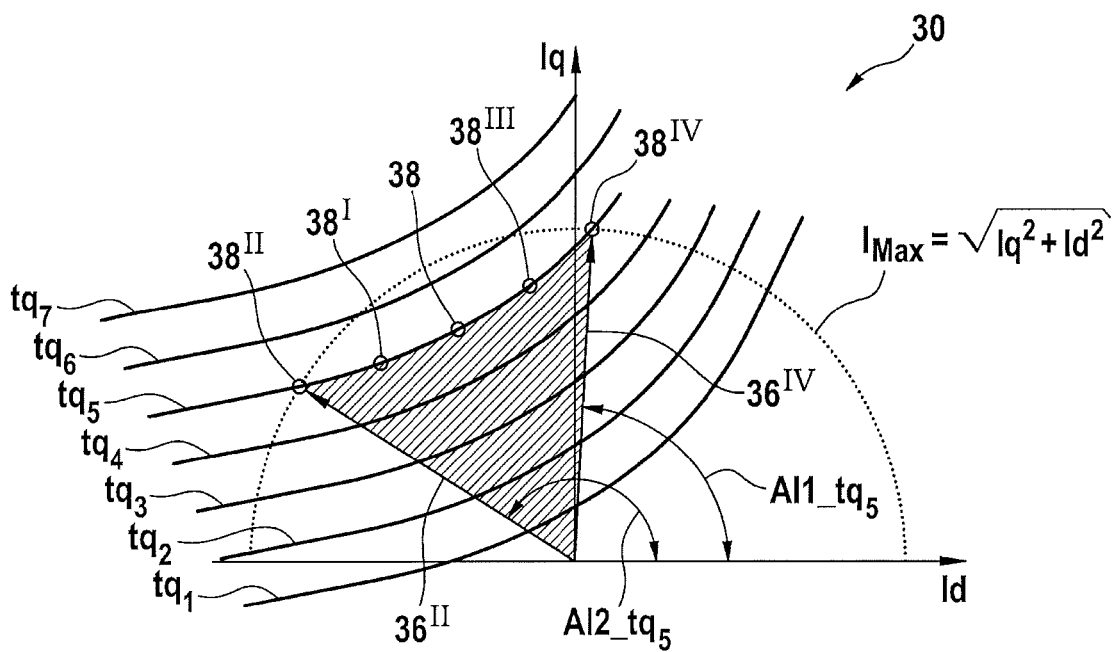
FIG. 4 shows a diagram comparable to that of FIG. 3 for representing a specific embodiment of a method according to the present invention.

FIG. 4 shows a diagram comparable to that in FIG. 3, in which an incremental change in the operating point during a motor startup operation is carried out instead of a reduction in torque. This makes use of the degree of freedom, that the required torque $tq_5$ may be set on the basis of different current vectors. FIG. 4 here shows the possible range of variation of current components Id and Iq, each of which results in the same torque $tq_5$. Furthermore, FIG. 4 shows operating point 38 at which current consumption is minimal.

Current vector 36 may then be set incrementally to different operating points 38', 3", 38"', $38^{IV}$ without any change in the torque output.

The limiting values of the shift in operating point are located at the points of intersection of the characteristic line of requested torque $tq_5$ with maximum current $I_{MAX}$, and are shown at 38' and $38^{IV}$ in FIG. 4. The corresponding current vectors at these limiting values are shown at 36" and $36^{IV}$.

In other words, an incrementally rotating current vector 36 is set during a motor startup operation (e.g., from angle AI1_tq5 to angle AI2_tq5) which results in other power switches constantly conducting the corresponding maximum current. The maximum load which occurs permanently at a standstill normally on precisely one power switch is thus distributed cyclically among multiple power switches. As a result, a peak thermal load on each individual power switch is reduced at a standstill and thus the possible long-term load, i.e., the startup torque or standstill torque, which is permanently adjustable, may be increased.

The number of operating points shown here is to be understood merely as an example. It is generally possible to approach only two different operating points to carry out the method. As an alternative, it is also possible to approach a greater number, such as three, four, five or more different operating points.

Figure 5:
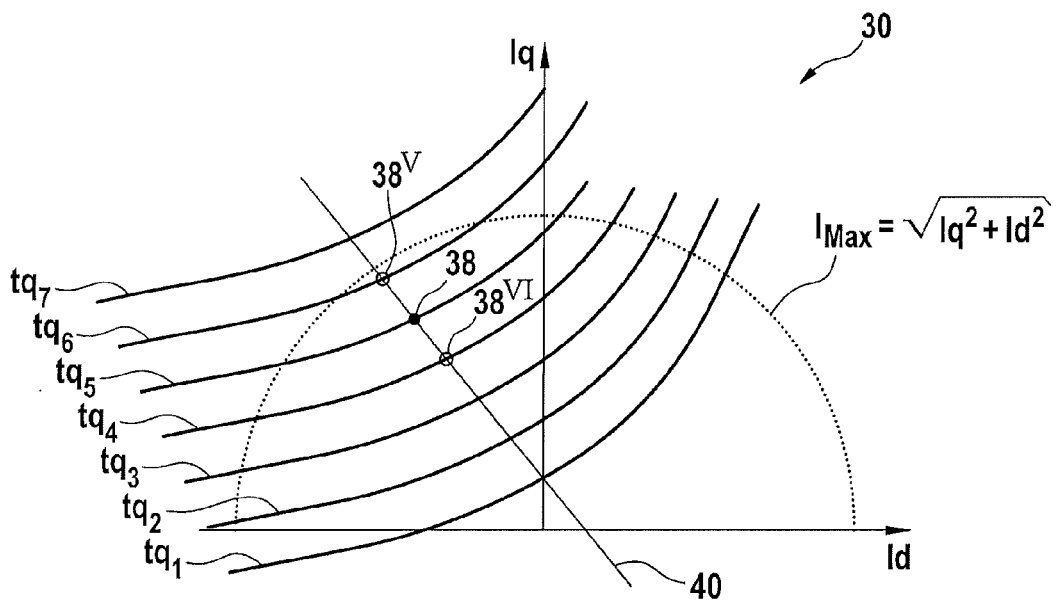
FIG. 5 shows a diagram comparable to that of FIG. 3 for representing a further specific embodiment of a method according to the present invention.

FIG. 5 shows an alternative specific embodiment of a method for controlling an electric machine during a motor startup operation. Here again, a shift in operating point takes place to establish a startup torque $tq_5$. The power switches are controlled in such a way that operating points for providing different torques are approached in rapid sequence, as shown schematically at $38^V$ and $38^{VI}$ in FIG. 5. On the average, the torques provided in this way should yield required startup torque $tq_5$. FIG. 5 shows as an example that a higher torque $tq_6$ and a lower torque $tq_4$ are approached as a result. Again in the present case, the number of selected operating points 38, $38^V$, $38^{VI}$ is only an example. It is generally possible to carry out the method with only two operating points or with a definitely higher number of operating points.

Furthermore, FIG. 5 shows that the modulation of the torque is preferably along a line 40 at which the total current required to achieve the corresponding torques is minimal.

Figure 6:
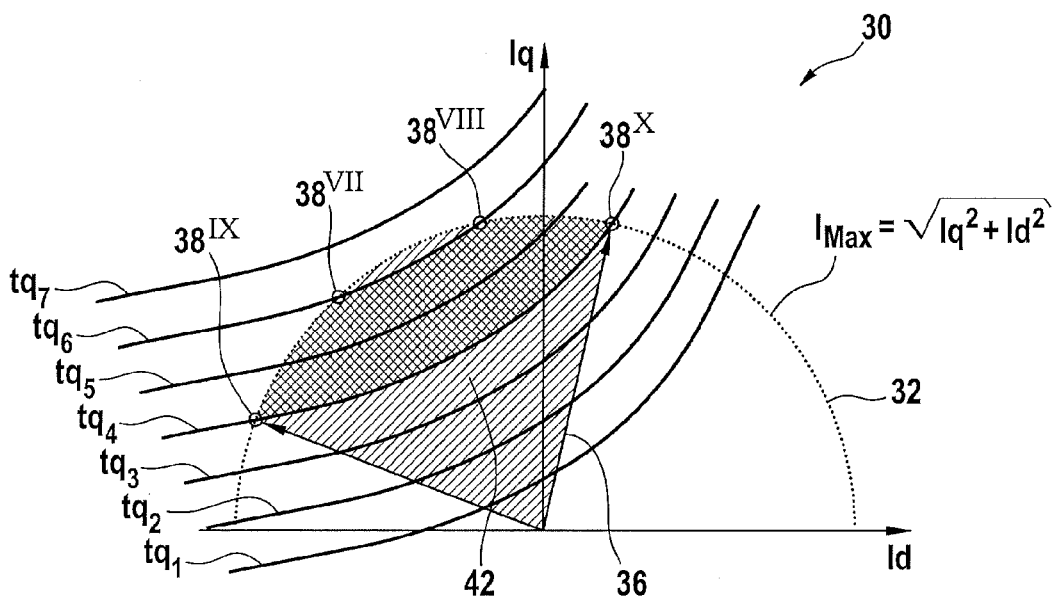
FIG. 6 shows a diagram comparable to that of FIG. 3 for representing a further specific embodiment of a method according to the present invention.
Figure 7:
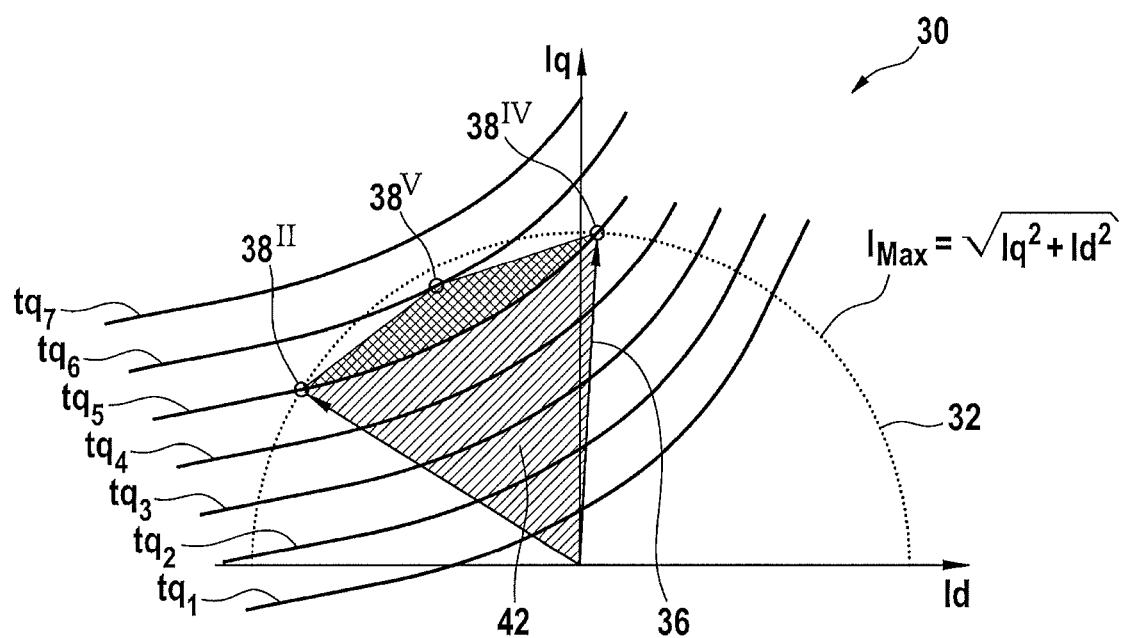
FIG. 7 shows a diagram comparable to that of FIG. 3 for representing a further specific embodiment of a method according to the present invention.

FIGS. 6 and 7 show additional alternative specific embodiments of methods for controlling an electric machine during a motor startup operation. In the methods shown in FIGS. 6 and 7, one current vector is moved incrementally between the different operating points, which may lie on lines of constant torque ($tq_1$ through $tq_7$) or may include different torques. A usable range 42 of current vector 36 is defined for this purpose in the dq diagram. In FIG. 6, current vector 36 may be moved incrementally or may oscillate between four operating points $38^{VII}$, $38^{VIII}$, $38^{IV}$, $38^X$, for example. Operating points $38^{VII}$, $38^{VIII}$ are located on a line $tq_6$ of a constant torque. Other operating points $38^{IX}$, $38^X$ are on a line $tq_4$. In this specific embodiment, all operating points are within the semicircle defining maximum total current $I_{max}$.

In the specific embodiment of FIG. 7, for example, three operating points are approached in oscillation or incrementally. These are operating points $38^{II}$, $38^{IV}$, $38^V$, which were already described in conjunction with FIG. 4 and FIG. 5.

What is claimed is:

1. A method for controlling an electric machine during a motor startup operation with the aid of a power electronics device having a plurality of controllable power switches connected to the electric machine for the purpose of supplying the electric machine with an electrical current in polyphase form, the method comprising:

controlling the power electronics device in such a way that one of an idle and a starting electric machine outputs one of a standstill torque and a startup torque, wherein the controlling of the power electronics device for outputting the one of the standstill torque and the startup torque takes place in such a way that a switch position of at least two of the power switches is changed so that the power switches are under a more uniform load;

wherein the controlling of the power electronics device takes place in a field-oriented manner, a space vector being changed incrementally for outputting the startup torque; and wherein the space vector is a current vector that is rotated incrementally along a line of constant torque for outputting the startup torque.

2. The method as recited in claim 1, wherein the power electronics device is for use in a motor vehicle.

3. A method for controlling an electric machine during a motor startup operation with the aid of a power electronics device having a plurality of controllable power switches connected to the electric machine for the purpose of supplying the electric machine with an electrical current in polyphase form, the method comprising:

controlling the power electronics device in such a way that one of an idle and a starting electric machine outputs one of a standstill torque and a startup torque, wherein the controlling of the power electronics device for outputting the one of the standstill torque and the startup torque takes place in such a way that a switch position of at least two of the power switches is changed so that the power switches are under a more uniform load;

wherein the controlling of the power electronics device takes place in a field-oriented manner, a space vector being changed incrementally for outputting the startup torque; and wherein the space vector is a current vector that is changed incrementally in such a way that a torque output by the electric machine changes.

4. The method as recited in claim 3, wherein the current vector is moved along a line of a minimal total current.

5. A method for controlling an electric machine during a motor startup operation with the aid of a power electronics device having a plurality of controllable power switches connected to the electric machine for the purpose of supplying the electric machine with an electrical current in polyphase form, the method comprising:

controlling the power electronics device in such a way that one of an idle and a starting electric machine outputs one of a standstill torque and a startup torque, wherein the controlling of the power electronics device for outputting the one of the standstill torque and the startup torque takes place in such a way that a switch position of at least two of the power switches is changed so that the power switches are under a more uniform load;

wherein the controlling of the power electronics device takes place in a field-oriented manner, a space vector being changed incrementally for outputting the startup torque; and wherein the space vector is moved one of by oscillation and cyclically in a range between at least two limiting values.

6. A device for controlling an electric machine during a motor startup operation, comprising:
- a power electronics device including a plurality of controllable power switches connected for the purpose of supplying the electric machine with an electrical current in polyphase form; and
- a control unit for controlling the power electronics device, the control unit including an arrangement for controlling the power electronics device in such a way that one of an idle and a starting electric machine outputs one of a standstill torque and a startup torque, wherein the controlling of the power electronics device for outputting the one of the standstill torque and the startup torque takes place in such a way that a switch position of at least two of the power switches is changed so that the power switches are under a more uniform load;

wherein the controlling of the power electronics device takes place in a field-oriented manner, a space vector being changed incrementally for outputting the startup torque; and wherein the space vector is a current vector that is rotated incrementally along a line of constant torque for outputting the startup torque.

7. The device as recited in claim 6, wherein the power electronics device is for use in a motor vehicle.

8. A motor vehicle drive train, comprising:
- at least one electric machine for providing a driving power; and
- a device for controlling an electric machine during a motor startup operation, comprising:
  - a power electronics device including a plurality of controllable power switches connected for the purpose of supplying the electric machine with an electrical current in polyphase form, and
  - a control unit for controlling the power electronics device, the control unit including an arrangement for controlling the power electronics device in such a way that one of an idle and a starting electric machine outputs one of a standstill torque and a startup torque, wherein the controlling of the power electronics device for outputting the one of the standstill torque and the startup torque takes place in such a way that a switch position of at least two of the power switches is changed so that the power switches are under a more uniform load;

wherein the controlling of the power electronics device takes place in a field-oriented manner, a space vector being changed incrementally for outputting the startup torque; and wherein the space vector is a current vector that is rotated incrementally along a line of constant torque for outputting the startup torque.

* * * * *